F. B. ALLEN.
CLUTCH.
APPLICATION FILED MAR. 30, 1911.
1,049,967.
Patented Jan. 7, 1913.
2 SHEETS—SHEET 1.
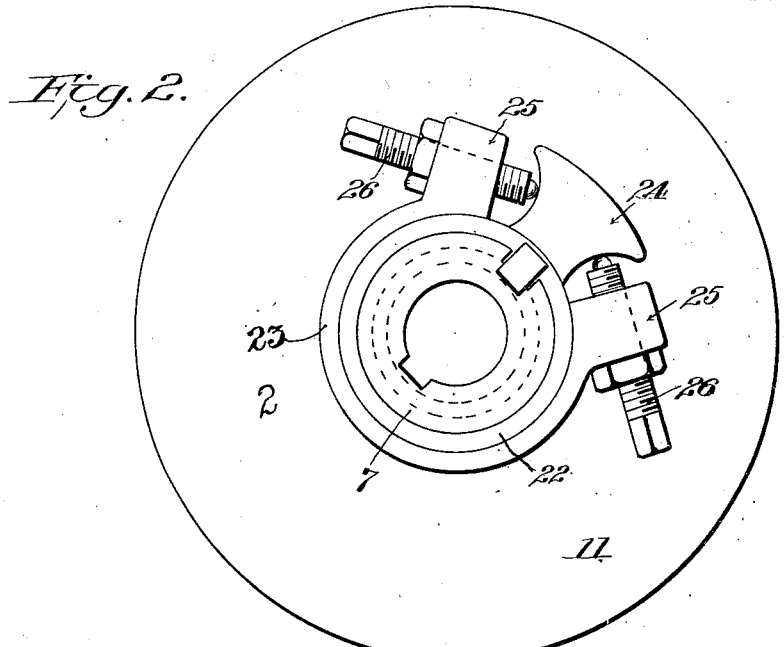
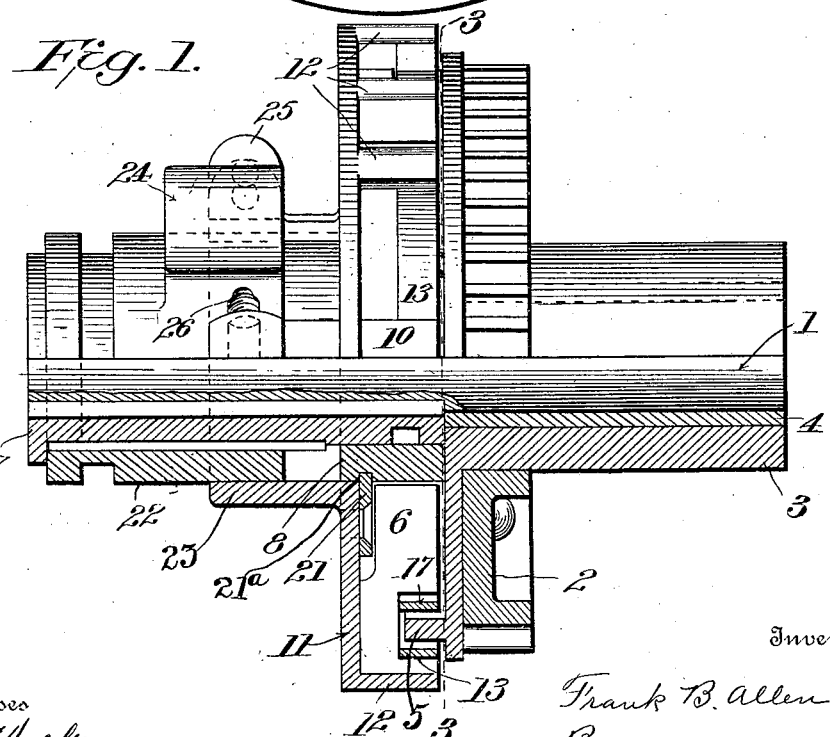
Witnesses
Inventor
Frank B. Allen
By Sturtevant Mason
Attorneys F. B. ALLEN.
CLUTCH.
APPLICATION FILED MAR. 30, 1911.
1,049,967.
Patented Jan. 7, 1913.
2 SHEETS—SHEET 2.
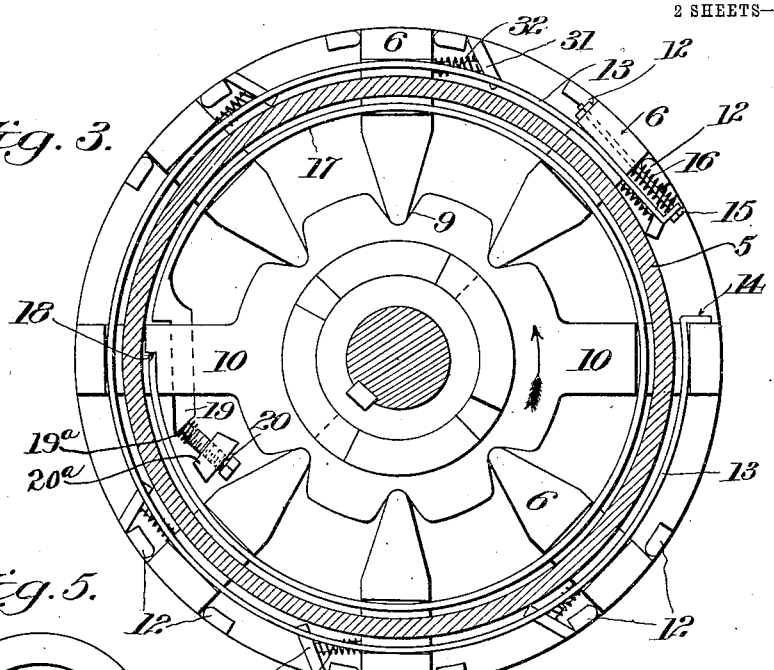
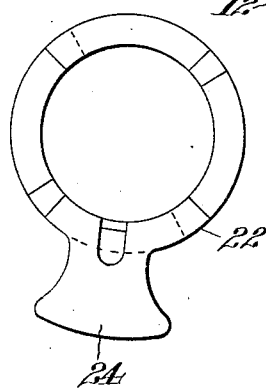
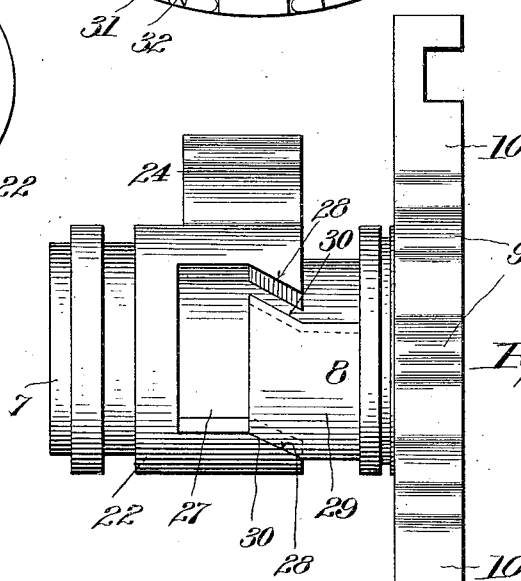
Witnesses
Inventor
Frank B. Allen
By Sturtevant & Mason
Attorneys

UNITED STATES PATENT OFFICE.

FRANK B. ALLEN, OF SALT LAKE CITY, UTAH.

CLUTCH.

1,049,967.  Specification of Letters Patent.  Patented Jan. 7, 1913.

Application filed March 30, 1911. Serial No. 618,039.

*To all whom it may concern:*

Be it known that I, FRANK B. ALLEN, a citizen of the United States, residing at Salt Lake City, in the county of Salt Lake, State of Utah, have invented certain new and useful Improvements in Clutches, of which the following is a description, reference being had to the accompanying drawing, and to the letters and figures of reference marked thereon.

The invention relates to new and useful improvements in clutches for connecting one rotating element to another.

An object of the invention is to provide a clutch wherein a rotating element may be frictionally connected to a second element to rotate the same.

A further object of the invention is to provide a clutch of the above character, wherein the parts may be adjusted so that the friction on the clamping parts may be varied.

In the drawings, which show by way of illustration one embodiment of the invention, Figure 1 is a view, partly in section, showing the essential parts of my clutch; Fig. 2 is an end view of the same; Fig. 3 is a sectional view on the line 3—3 of Fig. 1; Fig. 4 is a detail, showing the shiftable hub and the sleeve for shifting the same; and Fig. 5 is a detached view of the disk which holds the clutch members.

In the drawing, I have shown a shaft 1 which may be clutched to a gear 2. The gear 2 is carried by a sleeve 3, which runs freely on a bushing 4 on the shaft 1. The shaft 1 may be either a driving or a driven member and the gear 2 may be either the driven or driving member. The member 2 is herein shown in the form of a gear, although it will be obvious that any other suitable driving or driven means may be substituted for that herein shown.

The essential feature of the invention consists in the means for connecting the driving and driven members, and with this understanding of the scope of the invention, the member 2 will be referred to herein as a gear.

The gear 2 is bolted or secured in any desirable way to a flange carrying a transmission or gripping ring 5. This gripping ring is adapted to be engaged by a plurality of clutch dogs 6.

The sleeve 7 is keyed to the shaft 1, and a hub 8 is mounted on the sleeve 7, so as to rotate freely thereon. The hub 8 is provided with a series of recesses or pockets 9, which engage the inner ends of the radial supports 6. Said hub 8 is also provided with radially extending arms 10, which are recessed to provide a way through which extends the transmission ring 5.

A disk 11 is supported by the sleeve 7, and at its outer end is provided with spaced arms 12, 12, between which rest the outer ends of the radial supports 6. Each of these radial supports is recessed, so as to receive the transmission ring 5. Between the outer face of the transmission ring 5, and the outer faces of the recesses in the radial supports 6, is located a gripping band 13.

The end 14 of the gripping band engages one of the radial arms 10, and the other end of the gripping band engages a bolt 15, which passes through one of the radial supports 6. A spring 16 surrounds said bolt, and yieldingly holds the end of the friction band 13 against the head of the bolt. The friction or gripping band 13 is preferably of such size that normally said band is out of engagement with the transmission ring 5. Upon the turning of the hub and the arm 10 in the proper direction, it will be noted that the gripping band will be brought into contact with the transmission ring, and the disk 11 will thereby be locked to the part carrying the transmission ring 5.

A gripping band 17 is located between the inner face of the transmission ring 5, and the inner faces of the recesses in the radial supports 6. One end 18 of the inner friction band engages one of the radial arms 10, and the other end of this friction band has an enlarged inclined head 19, which passes freely through the radial arm 10, and bears against a cushion spring 19ª carried by an adjustable screw 20.

The screw 20 is preferably mounted in a lug 20ª, carried by the disk 11. By adjusting the screw 20, the friction band 17 may be enlarged or contracted. The normal position of the friction band 17 is out of contact with the transmission ring 5. Upon the turning of the head and the radial arm 10 in the direction of the arrow in Fig. 3, the inner friction band 17 will be expanded until the same grips the inner face of the transmission ring 5.

From the above description, it will be apparent that by turning the hub relative to the disk 11 in the direction of the arrow indicated in Fig. 3, that the friction band will be caused to grip the transmission ring, and thus lock the disk 11 to the part carrying the transmission ring. Upon the turning of the hub in the opposite direction, the gripping bands will be caused to move out of contact with the transmission ring 5, and release the parts. The radial supports serve as a means for housing and guiding the friction bands, and for preventing the same from improper contact with the transmission ring through the gripping bands becoming laterally displaced or out of center relative to the axis of the shaft.

The disk 11 has a key 21 which engages a groove 21ª in the hub 8, and prevents a movement of the disk relative to the hub longitudinally of the shaft. A shifting sleeve 22 is mounted on the sleeve 7, and extends underneath a projecting flange 23 formed integral with the disk 11. The shifting sleeve 22 has an outwardly extending arm (see Figs. 1, 2 and 5). The flange 23 of the disk 11 is cut away, and provided with outwardly extending ears 25 which carry adjustable screws 26, adapted to bear against the sides of the projecting arm 24, carried by the shifting sleeve 22. By adjusting the screws 26, the position of the disk 11 relative to the shifting sleeve 22 may be varied. This shifting sleeve is keyed to the sleeve 7, so that said shifting sleeve may be moved longitudinally of the sleeve 7. It will, therefore, be noted that I have provided a means whereby the disk 11, which carries the friction gripping bands is fastened to the shaft 1, in such a manner that said disk may be adjusted relative to the shifting sleeve. As clearly shown in Fig. 4, the shifting sleeve is provided with a recess 27, which is so shaped as to form cam shoulders 28. The hub 8 has an outwardly projecting plate 29, which is also provided with cam faces 30, adapted to coöperate with the cam faces 28 on the shifting sleeve. If the shifting sleeve is moved to the right, as shown in Figs. 1 and 4, the cam faces 28 and 30 will operate to rotate the hub relative to the sleeve. Inasmuch as the sleeve 22 is fixedly connected with the disk 11, the hub 8 will also be rotated relative to the disk 11. This rotation of the disk 11 relative to the hub 8, which carries the transmission ring 5, will cause the gripping bands to grip said transmission ring or release the same, depending upon the direction of rotation of the hub relative to the disk 11.

By adjusting the position of the disk 11 relative to the sleeve 22, through the adjustable bolts 26, the throw of the hub relative to the disk is varied. The radial supports 6 are given an angular movement when the friction bands are brought into gripping contact with the transmission ring, so that the inner and outer faces of the recesses in said radial supports practically follow and remain in contact with the gripping bands.

The radial supports are returned to normal position through their positive connection with the hub 8. The springs 32 which are interposed between the lugs 31 and the radial support 6, serve to prevent any rattling of the same during the operation of the parts.

In the operation of my device, let us suppose the parts are in position so that the driving member runs free of the driven member. When it is desired to clutch the two parts together, a sleeve 22 is moved toward the hub and the cam faces 28 on the shifting sleeve will rotate the hub 9. This turning of the hub relative to the disk 11, causes the friction bands to grip the transmission ring and thus lock the disk 11 to the part carrying the transmission ring.

As above noted, the radial supports do not grip the transmission ring, but serve as a means for housing and guiding the friction bands and prevents the same from improper contact with the transmission ring through any possible lateral displacement of the friction bands relative to the axis of the shaft. Upon the turning of the hub in the opposite direction, the gripping band will be caused to move out of contact with the transmission ring and release the parts.

While I have described and claimed a gear mounted to rotate on a shaft, it will be understood that these terms are used in a broad sense, and that any other form of transmission element or elements may be used in the place thereof. In other words, the clutch herein shown is adapted for connecting a driving member to a driven member of any character.

It is obvious that minor changes in the details of construction may be made, without departing from the spirit of my invention as set forth in the appended claims.

Having thus described my invention, what I claim as new and desire to secure by Letters Patent, is:—

1. The combination of a shaft, a gear mounted to rotate on the shaft, a transmission ring carried by said gear, a hub loose on said shaft, a disk secured to the shaft, gripping bands for engaging said transmission ring, means connected with the hub for operating said gripping bands, and means for rotating the hub relative to the disk.

2. The combination of a shaft, a gear mounted to rotate on the shaft, a transmission ring carried by the gear, a hub loose on the shaft, a disk secured to the shaft, a gripping band connected at one end to said hub and at its other end to said disk, and adapted to frictionally engage said transmission ring, and means for rotating the hub relative to the disk.

3. The combination of a shaft, a gear mounted to rotate on the shaft, a transmission ring carried by the gear, a hub loose on the shaft, a disk secured to the shaft, a gripping band connected at one end to said hub and yieldingly connected at its other end to said disk and adapted to engage said transmission ring, and means for rotating the hub relative to the disk.

4. The combination of a shaft, a gear mounted to rotate on the shaft, a transmission ring carried by said gear, a hub loose on said shaft, a disk secured to the shaft, radial supports carried by said hub and disk, said supports having recesses to receive said transmission ring, radial arms carried by said hub and having recesses to receive said transmission ring, a gripping band located in the recesses in said radial supports and in said arms, one end of said gripping band being connected to one of said arms, and the other end of said gripping band being connected to one of said radial supports, and means for rotating the hub relative to the disk.

5. The combination of a shaft, a gear mounted to rotate on the shaft, a transmission ring carried by said gear, a hub loose on said shaft, a disk secured to the shaft, radial supports carried by said hub and disk, said supports having recesses to receive said transmission ring, radial arms carried by said hub and having recesses to receive said transmission ring, a gripping band located in the recesses in said radial supports and in said arms, one end of said gripping band being connected to one of said arms, and the other end of said gripping band being connected to one of said radial supports, a shifting sleeve, and means intermediate the sleeve and said hub, whereby said hub may be rotated by said sleeve.

6. The combination of a shaft, a gear mounted to rotate on the shaft, a transmission ring carried by said gear, a hub loose on said shaft, a disk secured to the shaft, radial supports carried by said hub and disk, said supports having recesses to receive said transmission ring, radial arms carried by said hub and having recesses to receive said transmission ring, a gripping band located in the recesses in said radial supports and in said arms, one end of said gripping band being connected to one of said arms, and the other end of said gripping band being connected to one of said radial supports, a shifting sleeve, means intermediate the sleeve and said hub, whereby said hub may be rotated by said sleeve, and means for adjustably connecting said disk to said shifting sleeve.

7. The combination of a shaft, a gear mounted to rotate on the shaft, a transmission ring carried by said gear, a hub loose on said shaft, a disk secured to said shaft, radial supports carried by said hub and disk and having recesses to receive the transmission ring, arms carried by the hub and having recesses to receive said transmission ring, an inner gripping band located in the recesses in said radial supports and in said arm and adapted to engage the inner face of the transmission ring, one end of said gripping band engaging one of said arms, the other end being connected to said disk, an outer gripping band located in the recesses in said radial supports and in said arms, and adapted to engage the outer face of said transmission ring, one end of said outer band engaging the other arm carried by the hub and being yieldingly connected to one of said radial supports at its other end, and means for rotating the hub relative to the disk.

8. The combination of a shaft, a gear mounted to rotate on the shaft, a transmission ring carried by said gear, a hub loose on said shaft, a disk secured to said shaft, radial supports carried by said hub and disk and having recesses to receive the transmission ring, arms carried by the hub and having recesses to receive said transmission ring, an inner gripping band located in the recesses in said radial supports and in said arm and adapted to engage the inner face of the transmission ring, one end of said gripping band engaging one of said arms, the other end being connected to said disk, an outer gripping band located in the recesses in said radial supports and in said arms, and adapted to engage the outer face of said transmission ring, one end of said outer band engaging the other arm carried by the hub and being yieldingly connected to one of said radial supports at its other end, a shifting sleeve, means intermediate the sleeve and said hub, whereby said hub may be rotated by said sleeve, and means for adjustably connecting said disk to said shifting sleeve.

9. The combination with a shaft, a gear mounted to rotate on the shaft, a transmission ring carried by said gear, a hub loose on said shaft, a disk secured to said shaft, radial supports carried by said hub and disk and having recesses to receive the transmission ring, arms carried by said hub and having recesses to receive said transmission ring, an inner gripping band located in the recesses in said radial supports and said arm, and adapted to engage the inner face of the transmission ring, an adjusting screw carried by one of said arms and engaging one end of said gripping band, the other end of said gripping band being connected to one of said radial supports, an outer gripping band located in the recesses in said radial supports, and in said arms, and adapted to engage the outer face of said transmission ring, one end of said outer band engaging the other arm carried by said hub and being yieldingly connected to one of said radial supports at its other end, a shifting sleeve, means intermediate the sleeve and said hub whereby said hub may be rotated by said sleeve, and means for adjustably connecting said disk to said shifting sleeve.

10. The combination of a shaft, a gear mounted to rotate on the shaft, a transmission ring carried by said gear, a hub loose on said shaft, a disk secured to the shaft, radial supports carried by said hub and disk, said supports having recesses to receive said transmission ring, radial arms carried by said hub and having recesses to receive said transmission ring, gripping bands located in the recesses in said radial supports and in said arm for engaging the inner and outer surfaces of the transmission ring, a shifting sleeve, said shifting sleeve being cut away to form a recess with cam faces and said hub having a projecting member formed with cam faces coöperating with the cam faces on said shifting sleeve.

In testimony whereof I affix my signature, in presence of two witnesses.

FRANK B. ALLEN.

Witnesses:
M. K. PALMER,
GEO. F. GOODWIN.

---

Copies of this patent may be obtained for five cents each, by addressing the "Commissioner of Patents, Washington, D. C."